United States Patent [19]

Funk

[11] 4,032,050

[45] June 28, 1977

[54] MEASURING CLOSURE FOR CONTAINERS

[76] Inventor: Richard J. Funk, 344 N. Mulberry, Lancaster, Pa. 17603

[22] Filed: Feb. 19, 1976

[21] Appl. No.: 659,470

[52] U.S. Cl. .............................. 222/284; 222/362
[51] Int. Cl.² ...................................... G01F 11/06
[58] Field of Search .................. 222/362, 370, 284

[56] References Cited

UNITED STATES PATENTS

| | | | |
|---|---|---|---|
| 1,752,720 | 4/1930 | Bergelson | 222/362 X |
| 2,002,039 | 5/1935 | McPhee | 222/284 X |
| 2,579,388 | 12/1951 | Lowry | 222/362 X |
| 2,584,781 | 2/1952 | Beatty | 222/362 |
| 3,129,853 | 4/1964 | Hoskins | 222/362 X |

Primary Examiner—Stanley H. Tollberg
Assistant Examiner—Hadd Lane

Attorney, Agent, or Firm—Shoemaker and Mattare, Ltd.

[57] ABSTRACT

A measuring and dispensing closure for dispensing a measured amount of material from a container. The closure has a wedge rotatably secured between a pair of discs one of which is attached to the container and each having defined therein a dispensing slot which is offset from the other dispensing slot. The wedge has a metering chamber which is alignable with the dispensing slots in the discs for dispensing a metered amount of material from the container, and a sealing surface alignable with the dispensing slot in the disc attached to the container for effecting an essentially air-tight seal of the container. The metering chamber is divided so that less than a full charge of material can be dispensed.

1 Claim, 6 Drawing Figures

U.S. Patent  June 28, 1977  4,032,050
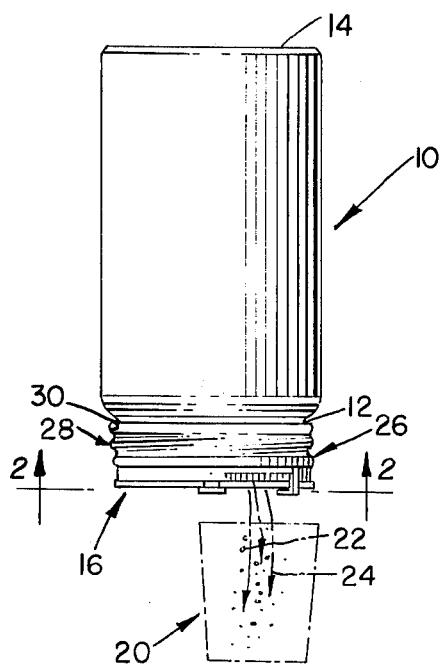
FIG.1.
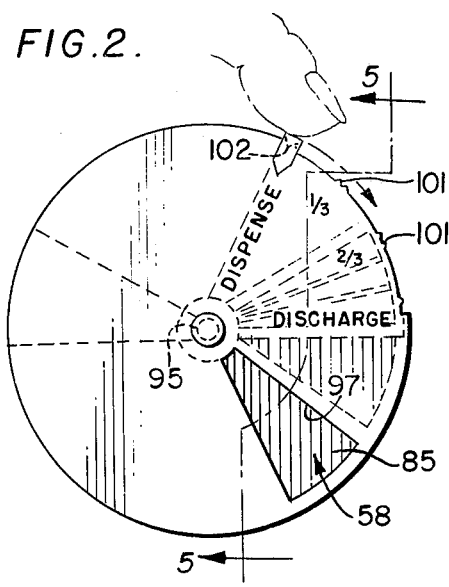
FIG.2.
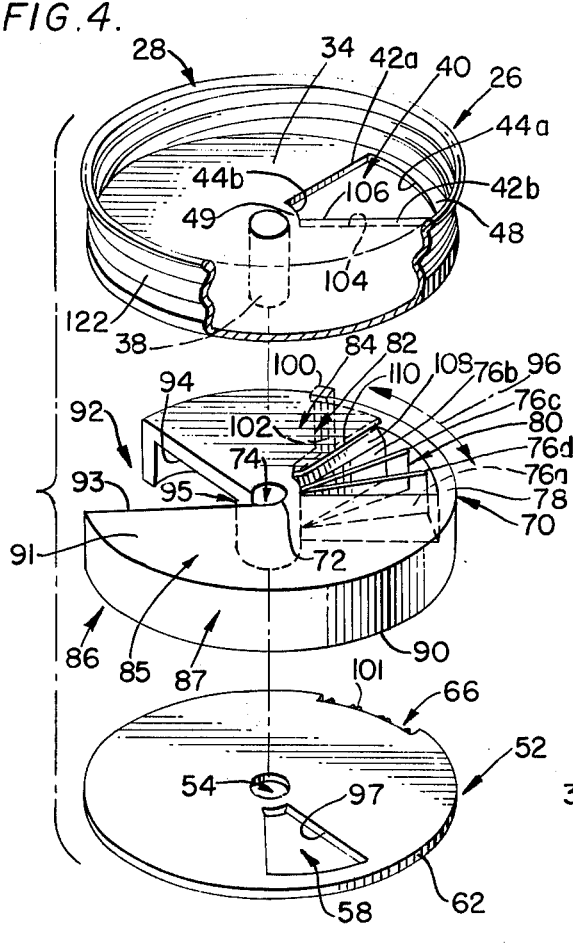
FIG.4.
FIG.3.
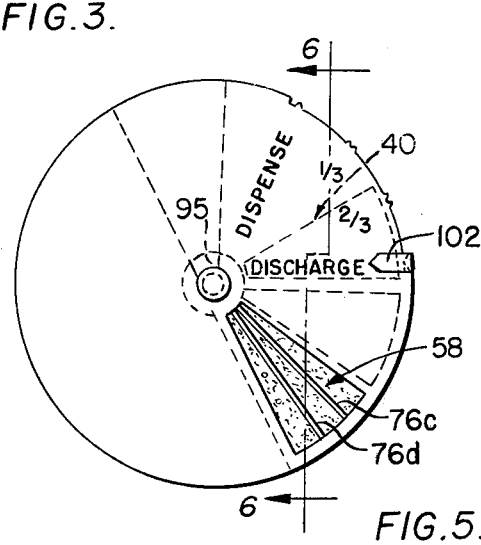
FIG.5.
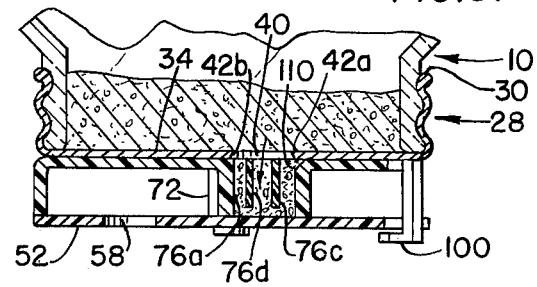
FIG.6.
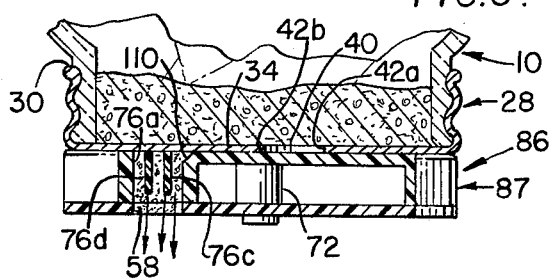

MEASURING CLOSURE FOR CONTAINERS

BACKGROUND OF THE INVENTION

The present invention relates in general to dispensing of materials and, more particularly, to a container closure which dispenses metered amounts of a material from the container.

At the disposal of the modern homemaker are many recipes which in some manner or other require a measured or metered amount of material to be dispensed from a container. The most common example of such recipes is a teaspoon of sugar in a cup of coffee. There are endless other examples of recipes calling for a measured amount of at least one ingredient. Some examples are: spices in recipes; tea; flour; salt; even the amount of instant coffee required for the one cup of coffee.

Commonly, to dispense such metered amounts of materials, one simply inserts one of several sized measuring spoons into the jar, or container, containing the material and withdraws the required amount therefrom. This procedure has proven to be time consuming and wasteful if the spoon is accidentally dropped or over-turned before the desired time.

Dispensing tops or caps placed on the container used to store such materials alleviates some of the aforementioned problems. However, known dispensing caps still suffer several deficiencies. For example, known dispensing means which are attached to a container do not seal the container tightly enough to insure the explusion of air from that container. Thus, the contents quickly dry out and are also subject to spoiling due to contact with particles in the air.

A further problem with known dispensing caps arises because some of the material being dispensed is likely to become lodged in the dispensing means thereby jamming it or destroying any slight air seal which may be present. This problem is especially troublesome if the material is formed of small granules, such as sugar or salt.

Furthermore, known dispensing caps are generally difficult to manufacture and hence are expensive. Many often have odd shapes and thus create storage problems for a user once the cap is installed on the jar.

Because of these drawbacks, and especially the drawback resulting from material spoilage, dispensing caps have not gained wide acceptance.

SUMMARY OF THE INVENTION

The dispensing device embodying the teachings of the present invention securely and reliably seals a container, and thus prevents the spoiling of the material contained in the container due to undue exposure thereof to the air.

The device embodying the teachings of the present invention comprises a wedge-shaped member which is positioned between a pair of spaced apart discs. The discs are fixedly secured together by a post and have offset openings. One disc covers the container top and forms a threaded lid therefor, and the other disc forms an outer top of the device. The wedge has a plurality of walls which form a divided chamber and a sealing section, and is pivotable about the post.

Thus, when the wedge is pivoted to align the chamber with the hole in the lid, material is dispensed thereinto. According to the position of the chamber with respect to the lid hole, various sized charges of material can be dispensed into the chamber, and hence from the device. When the wedge is then rotated to align the chamber with the outer disc hole, material in the chamber is dispensed therethrough after the sealing portion of the wedge has sealed the lid hole.

The dispensing top of the present invention therefore prevents dirt or other foreign matter from entering the container as well as provides an essentially air-tight seal. Thus, the material is protected from spoiling due to undue exposure to the air as well as from foreign material in that air.

The container top has lips located on the wedge and on the threaded lid which prevent material from slipping between the wedge and the container lid disc, and thus, the top is unlikely to malfunction due to jamming of material between the disc lid and the wedge.

Because it is easily manufactured, the top is relatively cheap as compared to known tops. Thus, the container can be sold with the top already in place, and the top can be disposed of with the container after the contents thereof have been exhausted.

Because the containers with the present tops secured thereon are easily stored and/or packaged, it is even more desirable to sell the container with the top already secured in place. The storeowner and/or customer is not faced with a storage problem complicated by a difficult-to-store container shape because the outer disc is flat and securely supported away from the threaded lid by the post and the wedge.

OBJECTS OF THE INVENTION

It is therefore a main object of the present invention to effect an air-tight seal on a container with a measuring dispensing top.

It is another object of the present invention to provide a dispensing top for a container which enables the container to be easily stacked and/or packaged.

It is a further object of the present invention to provide a dispensing top for a container which is unlikely to become jammed by the material being dispensed.

It is yet another object of the present invention to provide a dispensing top for a container which is easily and inexpensively manufactured.

It is still a further object of the present invention to provide a dispensing top for a container which can dispense various amounts of accurately metered material.

These together with other objects and advantages which will become subsequently apparent reside in the details of construction and operation as more fully hereinafter described and claimed, reference being had to the accompanying drawings forming part hereof, wherein like numerals refer to like parts throughout.

BRIEF DESCRIPTION OF THE DRAWINGS

FIG. 1 is a general elevational view of a container having thereon a dispensing top made in accordance with the teachings of the present invention;

FIG. 2 is a section along line 2—2 of FIG. 1;

FIG. 3 is a section along line 2—2 of FIG. 1 showing the dispensing cap in an open position;

FIG. 4 is an exploded perspective view of the dispensing cap made in accordance with the teachings of the present invention;

FIG. 5 is a sectional view taken along line 5—5 of FIG. 3; and

FIG. 6 is a sectional view taken along line 6—6 of FIG. 3.

DETAILED DESCRIPTION OF THE PREFERRED EMBODIMENT

Shown in FIG. 1 is a container 10 of the type commonly used in a household for storing materials such as coffee, tea, sugar, or the like. The container 10 is shown in an inverted orientation and has an exteriorly screw threaded neck 12 which cooperates with a complementary threaded lid (not shown) to effect an airtight seal of the container and thereby prevent spoiling of any material stored in the container 10 by air or particles in the air.

Container 10 has a bottom 14 and the usual lid is replaced by the measuring and dispensing closure or cap 16 embodying the teachings of the present invention. Located beneath cap 16 is a receptacle, such as cup 20, which receives material 22 dispensed from the container via the cap 16 as indicated by arrows 24 in FIG. 1. The cap attaches to the neck 12 by means of container threaded lid member 26 including a skirt 28 which has defined therein screw threads 30 which are complemental with the neck screw threads 12.

The cap 16 is best shown in FIG. 4 and comprises lid 26 having sealing disc 34 spanning the area bounded by skirt 28 which depends therefrom to place disc 34 in sealing engagement with the mouth of container 10. The disc 34 has a centrally located post 38 fixed thereto and an eccentrically located initial dispensing opening 40. The opening 40 is shown to be wedge-shaped having radial sides 42a and 42b and arc edges 44a and 44b defining the boundries thereof, however other shapes can also be used. The opening is sized to define a margin 48 between edge 44a and skirt 28 and a margin 49 between edge 44b and post 38, however other opening sizes can also be used. As shown, except for the initial opening 40, the disc 34 is imperforate and will therefore serve to effect an air-tight seal on container 10 when the opening 40 is sealed.

An outer disc 52 is fixedly attached to the end of the post 38 which is remote from disc 34 to be in spaced parallelism therewith. The outer disc 52 has defined therein a post receiving hole 54 in the center thereof and a final dispensing opening 58 between the hole 54 and the outer marginal edge 62 in a manner similar to initial dispensing opening 40.

The openings 40 and 58 are angularly offset from each other by an amount which is predetermined according to considerations which will be set out in greater detail below. Also defined in the disc 52 is a sector 66 located in the outer marginal edge 62 of the disc 52. The purpose and function of the sector 66 will also be described in greater detail below.

The disc 52 is of a diameter which corresponds to that of the disc 34 to extend thereover for covering same. With the stacked configuration shown in FIG. 1 for discs 34 and 52, a plurality of containers 10, each having a cap 16 thereon, can be stacked on the top of each other for convenient storage and/or packaging.

Located between, and in contact with, discs 34 and 52, and pivotally attached to post 38, is a metering wedge 70. The wedge 70 has a hub 72 having defined therein a post receiving bore 74. The post forms an axle about which the wedge rotates. Radiating outwardly from hub 72 are diverging walls 76a, 76b, 76c, and 76d, which intersect outer wall 78, which, like the walls 76 is oriented to be essentially perpendicular to the discs 34 and 52.

As shown in FIG. 4, there are four walls, with walls 76a and 76b defining a metering chamber 80 therebetween, wall 76b defining one end of a sealing section 82 having a sealing floor 84 connected to wall 76b at the bottom thereof, and walls 76c and 76d dividing the metering chamber 80 into equal sections for dispensing fractions of a complete charge, as for example, ⅓, ⅔, or the like. Other fractions can also be used without departing from the teachings of the present invention. The fractional charge will be discussed in greater detail below.

The wedge 70 is a sector of a complete circle, and sealing floor 84 is part of floor 85 of a dispensing housing 86, and lies in the plane thereof. The housing has a marginal skirt 87 which is a continuation of wall 78 and has an outer diameter essentially equal to the outer diameters of discs 52 and 34. A plurality of finger grip means can be located on the outside surface for the skirt 87 fo gripping when rotating the wedge 70 about post 38 during a dispensing and/or sealing operation. Outer edge 90 of the skirt 87 contacts disc 52, and surface 91 of floor 85 contacts disc 34 to provide support for the cap 16. A cutout sector 92 is defined by edge 93 of floor 85 and edge 94 of floor 84 and is shown in FIG. 4 to be essentially V- or wedge-shape, similar to the shape of the chamber 80, and provides an opening through which post 38 can be moved to attach that post to the hub 72. Accordingly, hub 72 has a cutout portion 95 extending axially thereof and located in cutout 92 to enable the post 38 to be engaged in bore 74 of that hub. For added strength, another wall can extend from floor 85 at edge 94 and have an upper edge contacting disc 52. The hub is preferably made of plastic material and is slightly flexible for permitting the post 38 to be snapped into place within bore 74 of the hub 72.

The walls 76b and floor edge 94 are angularly displaced from each other a distance corresponding to, or slightly greater than, the angular displacement between the radial sides 42a and 42b of the initial opening 40 so that sealing floor 84 will completely cover that opening when the wedge is rotated on post 38 to align the wedge sealing section with the initial opening 40. The walls also provide sufficient strength to the cap to ensure a secure sealing fit of the floor over the opening 40.

The metering chamber 80 is adapted to be aligned with the openings 40 and 58. Thus, when chamber 80 and initial opening 40 are fully or partially aligned (FIGS. 2 and 5) material is dispensed thereinto via opening 40 until the chamber (or a fractional portion thereof) is full. After filling the chamber 80 (or portion thereof), the wedge 70 is pivoted about post 38 until the chamber 80 is aligned with final opening 58 (FIGS. 3 and 6) to dispense the measured amount of material therethrough.

The openings 40 and 58 are angularly offset from each other a distance equal to, or slightly greater than, the angular distance between walls 76a and 76b but equal to or less than the angular displacement between wall 76b and floor edge 94 so that, when the wedge 79 is rotated in the direction of arrow 96 from a position whereat chamber 80, or a portion thereof, and initial opening 40 are aligned, to a position whereat chamber 80, or a portion thereof, and final opening 58 are aligned, the sealing floor 84 seals initial opening 40 before the leading wall 76a of the chamber 80 becomes aligned with the leading edge 97 of the final opening 58. This spacing and orientation enables the sealing floor 84 to completely seal the initial opening to effect an essentially air-tight seal thereover prior to dispensing material from chamber 80, a portion thereof. This air-tight seal can be used during storage as well as during the above-discussed dispensing procedure. Various positions of the wedge 70 during the dispensing procedure are shown in FIGS. 2 through 6.

The size of the metered charge discharge from chamber 80 can also be varied by adjusting the position of the chamber with respect to final opening 58 during the final discharge step so that the portions of chamber 80 defined between walls 76a and 76d, or between 76a and 76c, or the like, are aligned with opening 58 to discharge material therefrom. Thus, if, for example, only one-third of the full charge is desired (e.g., one-third of a teaspoon), the chamber 80 can be oriented with respect to initial opening 40 to be entirely filled, i.e. with wall 76b aligned with edge 42a, and wall 76a aligned with wall 42b. The wedge 70 is then rotated so that only part of the chamber 80, e.g. that part defined between wall 76a and 76d (i.e., one third thereof) is aligned with final opening 58, with the remainder of the opening being covered by floor 85. Thus, the wall 76d will be aligned with edge 97 to dispense one-third of a chamber-full of material, wall 76c aligned with edge 97 to dispense two-thirds of a chamberfull of material, and the like.

Attached to skirt 87 is a hooklike adjustment pin 100 which extends outwardly therefrom to be received in sector 66 of the outer disc 52. The sector 66 may also have a plurality of stop means 101 on one edge of the disc to cooperate with a complementally shaped surface 102 on the inside of pin 100 to effect bayonetlike adjustments for the various positions of the chamber. Movement of the pin 100 is effected by user's finger (as in FIG. 2) to vary the size of chamber 80.

Suitable markings such as the DISPENSING, DISCHARGE ⅓ and ⅔ marks shown in FIGS. 2 and 3, can be placed on the outer disc to indicate the size of the portion being received in the chamber 80 for metered dispensing therefrom.

One edge 104 of the initial opening can be chamfered to form a knife-edge 106, and one of the edges 108 of the wall 76b can be chamfered to form a knife-edge 110 as shown in FIG. 4. The knife-edges cooperate to prevent particles of material from lodging between that surface of the walls 76a and/or 76b which contacts outer surface 122 of the disc 34 thereby jamming the operation of the cap 16. The jamming is especially possible if the material being dispensed is in the form of small granules, such as sugar, salt, instant coffee, or the like.

The edges of walls 76c and 76d can also be chamfered in a similar manner, or the walls can be manufactured of a pliable material, such as thin plastic, so that granules of material would not become lodged between those wall edges and the discs thus jamming the cap 16. Alternatively, as shown in FIG. 6, the walls 76c and 76d can have a height slightly less than the height of the walls 76a and 76b so that material would not jam between the walls and the discs. This shortened height would, of course, be selected to minimize spilling of material from one chamber portion to the next over the walls during a metering operation wherein only a fraction of a total charge is being dispensed, while still preventing jamming of material between the edges of the walls and the discs.

The cap can be manufactured of plastic or other suitable material in a simple manufacturing process. Thus, containers can be sold with the cap 16 alredy affixed thereto, and the caps can be disposed of along with the containers after use. Such a procedure simplifies the storage and/or sale of both the containers and the caps. As the cap effects an air-tight seal, there is less chance of spoiling the contents of the container than there is if the usual screw-on cap must be replaced (after purchase of the container) by a separately purchased cap 16. Furthermore, other shapes and sizes of the component parts of the cap 16 can be manufactured to fit container shapes other than the one shown in FIG. 1.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A measuring and dispensing closure formed of plastic materials for a container or the like, comprising:
   a container lid member attachable to the container for readily covering and uncovering the container, said lid having a center post extending outardly therefrom, a dispensing slot defined therein for dispensing material from the container, and screw threads for cooperating with screw threads on the container to selectively attach and detach said lid from the container;
   a dispensing wedge rotatably attached to said center post and having a plurality of walls, two of which walls define therebetween a material measuring chamber for receiving material from the container via said lid dispensing slot when said measuring chamber and said lid dispensing slot are aligned, a chamfered portion on one wall of said material measuring chamber adjacent said lid for passing said material thereover into said chamber, and two of which walls have attached thereto a sealing means which is essentially imperforate to seal said lid dispensing slot when said sealing means is oriented to cover said lid dispensing slot when said dispensing slot is not in use to effect an essentially air-tight seal of the container, and further ones of said walls in said measuring chamber dividing that chamber into thirds for dispensing a measured amount of material which is less than that amount dispensed by a full chamber, and a housing on said dispending wedge having a floor and a skirt attached to said floor, said floor and said skirt contacting said lid, said floor having defined therein a slot and said dispensing wedge being attached to a hub having a cutout portion aligned with said slot for receiving said center post therein; and
   an outer top member fixedly secured to said center post and having a measured dispensing slot defined therein and adjustment means thereon for adjusting the amount of material dispensed from said material chamber, said measured material dispensing slot being positioned to cooperate with said dispensing wedge material measuring chamber to dispense material from said chamber for ultimately dispensing a measured amount of material from the container.

* * * * *